UNITED STATES PATENT OFFICE.

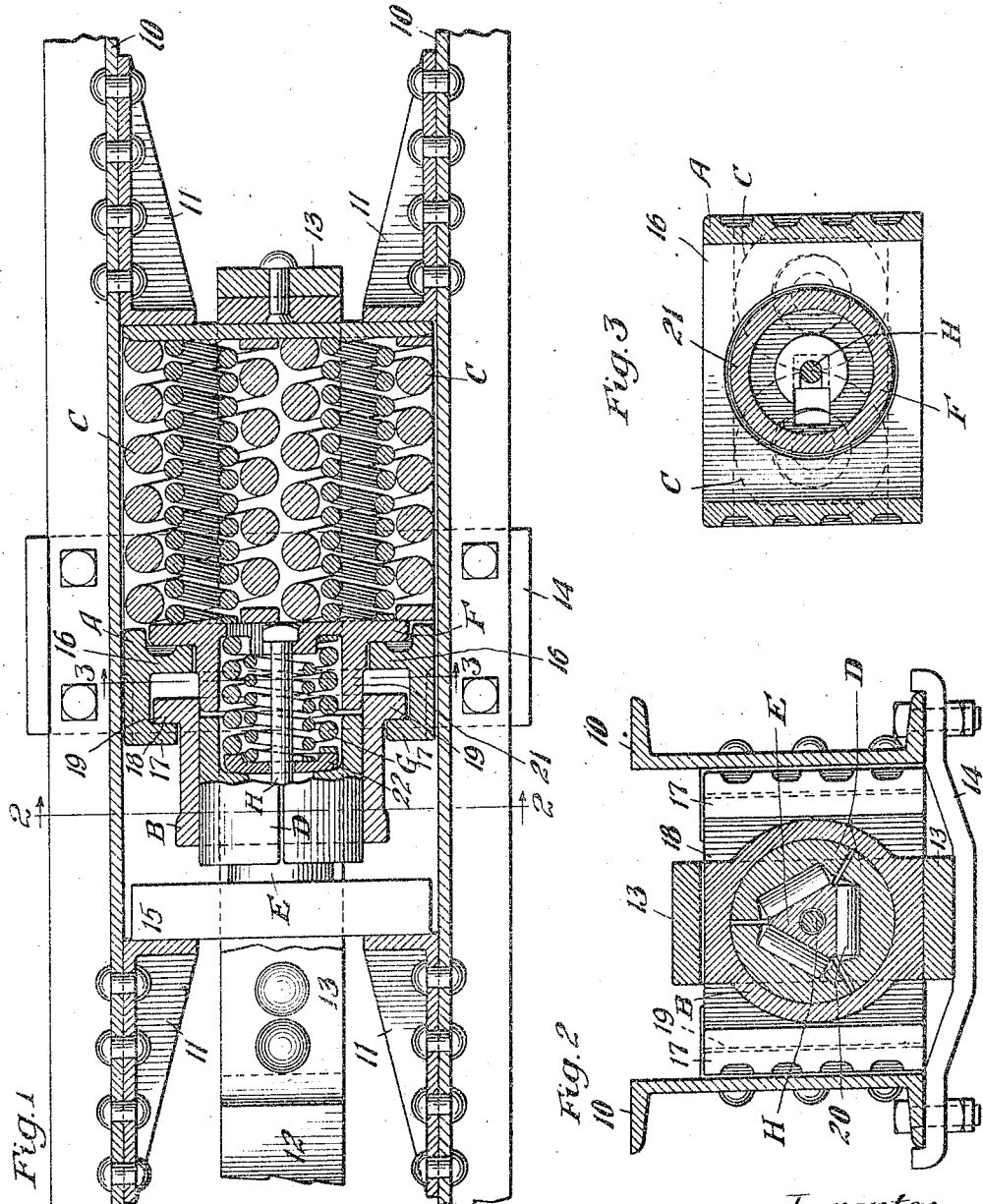

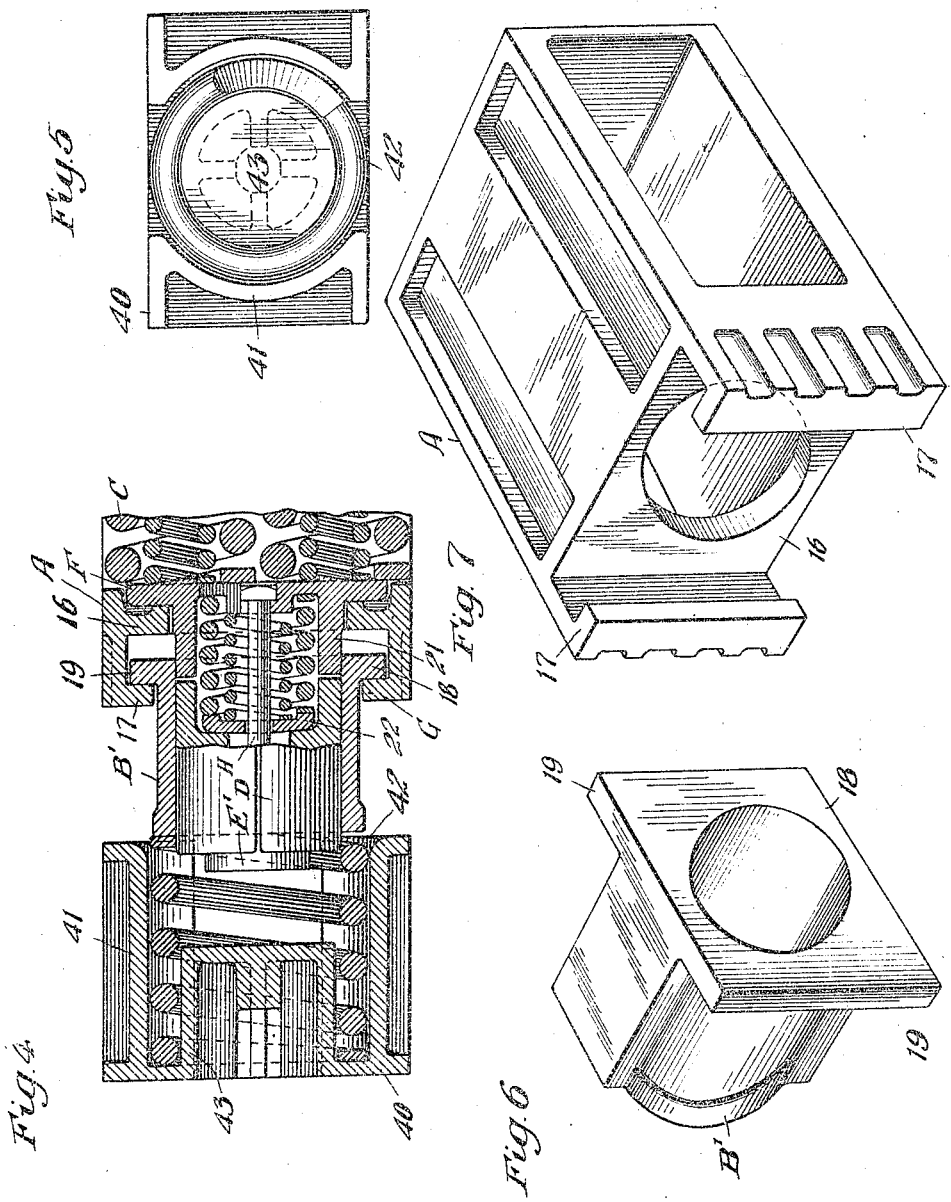

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,298,778. Specification of Letters Patent. Patented Apr. 1, 1919.

Application filed September 21, 1918. Serial No. 255,043.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanism, of which the following is a full, clear, concise, and exact description, reference being had to the accompanying drawings, forming a part of this specification.

This invention relates to improvements in friction shock absorbing mechanism.

One object of the invention is to provide a high capacity friction shock absorbing mechanism having a preliminary spring action.

Another object of the invention is to provide a friction mechanism employing a friction shell having coöperable friction elements and a spring casing, the arrangement being such that the shell and elements move in unison (or remain stationary, dependent upon the manner in which the mechanism is actuated) during the preliminary action.

Another and more specific object of the invention is to provide a mechanism accomplishing all of the above indicated results and wherein at the same time the friction shell is readily detachable to provide for renewal or repairs to thus minimize cost of upkeep.

In the drawing forming a part of this specification, Figure 1 is a longitudinal, horizontal, sectional view of a portion of a railway draft rigging showing my improvements in connection therewith. Figs. 2 and 3 are vertical, transverse, sectional views taken on the lines 2—2 and 3—3, respectively, of Fig. 1.

Fig. 4 is a view similar to Fig. 1, with parts broken away, illustrating my invention as applied to a buffer for passenger car equipment. Fig. 5 is an inner-end, elevational view of the follower shown with the buffer in Fig. 4. Fig. 6 is a detailed perspective of the friction cylinder, detached. And Fig. 7 is a detailed perspective of the spring casing and illustrates more particularly the manner of connecting the friction shell and spring casing to provide preliminary movement.

In said drawing, and referring first to the construction illustrated in Figs. 1, 2, 6 and 7, 10—10 denote channel-shaped draft sills of a railway car to the inner faces of which are secured front and rear lugs 11—11. The mechanism proper, hereinafter described, is operatively connected to the draw bar 12 by any suitable means, such as the yoke strap 13, and all the parts are supported by a detachable saddle plate 14. In the arrangement shown, a front follower 15 is employed, the same being interposed between the draw bar and the mechanism proper.

The friction mechanism comprises, broadly, a spring casing A, a friction shell B, twin main springs C—C, a plurality of friction shoes D, a wedge E, a spring follower F, an expansion spring G and a retaining bolt H.

The spring casing A is of generally rectangular formation with the sides thereof open so as to permit the lateral insertion of the main springs C—C after the spring follower F is in place. At its forward end, the casing A is provided on opposite sides thereof with vertically extending, forwardly facing shoulders 16—16 and opposed corresponding rearwardly facing shoulders 17—17, as most clearly shown in Fig. 7.

The friction shell B is shown of generally cylindrical form and is provided at its rear end with a flange portion as indicated at 18, the latter forming vertical shoulders on opposite sides thereof, as indicated at 19—19 in Figs. 1 and 6. The arrangement is such that the shell is insertible in a vertical direction between the shoulders 16 and 17 of the casing A and the spacing of the shoulders 16 and 17 is designed so as to permit a predetermined amount of lost motion between the shell and casing.

The friction shoes D and wedge E are of well known form, the shoes being circularly arranged within the shell B and the wedge extending outwardly beyond the shoes. A plurality of anti-friction rollers 20 is employed between the wedge and shoes.

The follower F is provided with a forwardly extending annular flange 21 which extends through a corresponding opening in the front wall of the casing A and normally into the rear end of the shell B. In this manner, the follower F serves to prevent accidental displacement of the shell B relatively to the casing A after the parts are once assembled. In the drawing, a slight clearance is shown between said annular flange 21 and the rear ends of the friction shoes D. This slight amount of clearance, which is designed primarily to compensate for any wear on the parts, will be taken up immediately upon compression of the gear before the gear proper actually comes into operation. The spring G is interposed between the follower F and a washer 22 which bears against inwardly extending shoulders formed on the shoes D, the spring G serving to maintain the friction elements in proper tight contact and eliminate rattling or looseness. The bolt H serves to place the spring G under compression and also prevents any of the friction elements from falling out of the friction shell.

In operation, assuming the mechanism to be actuated under buff, the friction shell, shoes, wedge and follower F, together with the small spring G, will travel bodily inwardly as a unit without actuation of any of the friction elements. This movement of the shell and associated elements is resisted by the main springs C—C so that a true preliminary spring action is obtained. This preliminary spring action continues until the friction shell engages with the shoulder 16 of the casing A, whereupon the friction elements will be moved relatively to the shell and thus create a much greater frictional resistance. From the above described action, it will, of course, be understood that the slight relative movement between the flange 21 and the shoes D is not considered, as this is so small as to not affect the operation of the mechanism. In draft, it will be evident that a similar result is obtained with the movement of the parts reversed.

Referring now to the construction illustrated more particularly in Figs. 4 to 7, it will be noted that the arrangement of friction shell, spring casing, friction elements and main springs is the same as that shown in Figs. 1, 2 and 3. In order, however, to adapt my improved construction for a buffer for passenger car equipment, I employ an outer cap or spring follower 40 having an inwardly extending cylindrical shell portion 41, which is adapted to telescope over the friction shell B'. Within the shell 41 is a preliminary spring 42 that bears at its rear end against the forward edge of the shell B'. The forward portion of the spring 42 is seated over an inwardly extending boss or cup 42 formed on the follower 40. The cup or boss 43 is adapted to engage with the wedge E' of the friction mechanism proper after the spring 42 has been compressed. In this connection, it will be understood that the spring 42 is employed primarily to hold the diaphragm plate of the vestibule diaphragm construction in tight engagement with an adjacent diaphragm face plate of the next car and does not, in reality, absorb any of the buffing or starting shocks. As will be evident, the operation of the shock absorbing mechanism proper is identical with that shown in Fig. 1 and need not here be repeated.

With the arrangement above described, it is evident that I obtain an easy graduated action with an ultimate high capacity and at the same time the friction shell may be readily renewed and the cost of repairs minimized. The detachable connection with the lost motion between the shell and casing lends itself readily to commercial manufacture by foundry processes and hence is adapted to keep down the initial production cost. Furthermore, it is evident that the friction mechanism proper which I have provided, can be used without change in a buffer for passenger cars by merely adding a primary spring and cap. The mechanism is thus capable of wide use and gives the desirable graduated easy action on either freight or passenger equipment.

I claim:

1. In a friction shock absorbing mechanism, the combination with a spring casing open at one end thereof, of a friction shell disposed at said open end of the casing, coöperating shoulders on said shell and casing adapting the shell for a limited amount of movement with respect to the casing, friction elements coöperable with said shell, spring means disposed within the casing, and a follower at the end of said spring means adjacent the shell, said follower having a flange extending through the open end of the casing and into the shell, said flange preventing accidental disengagement of the shell and casing.

2. In a friction shock absorbing mechanism, the combination with a spring casing open at its sides and at one end, of spring means within said casing and adapted to be inserted through the open sides thereof, a friction shell, said shell and casing having coöperable shoulders permitting a predetermined amount of relative movement between the shell and casing, the shell being assembled with the casing by movement transversely of the latter, friction elements coöperable with the shell, and a follower adapted to be inserted through said open sides of the casing, located between some of said friction elements and said spring means, the friction elements and shell and said follower moving bodily as a unit relatively to the casing and compressing the spring means for a predetermined amount, the friction elements being thereafter movable with respect to the shell and resisted by said spring means, said follower having means thereon extending into the shell to prevent movement of the latter transversely relatively to the casing after the parts are assembled.

3. In a friction shock absorbing mechanism, the combination with a spring casing having an end wall with an opening therein, said casing being provided with sets of spaced shoulders adjacent said opening and on the outer side of said wall, of a friction shell having laterally extended shoulders on opposite sides thereof, said shell being adapted to be assembled with said casing by moving the shell transversely of the casing with the shoulders of the shell between said sets of spaced shoulders of the casing, the shoulders of the shell being of lesser thickness than the space between the shoulders of each set of the casing to thereby permit the shell to move relatively toward and from said end wall of the casing, friction elements coöperable with said shell, spring means disposed within the casing, and means normally extending through said end wall opening of the spring casing into the interior of the adjacent end of the shell and bridging the space between said end wall and shell, said means preventing accidental movement of the shell transversely relatively to the casing.

In witness that I claim the foregoing I have hereunto subscribed my name this 28th day of Aug. 1918.

JOHN F. O'CONNOR.